United States Patent [19]

Nakashima et al.

[11] Patent Number: 4,881,611

[45] Date of Patent: Nov. 21, 1989

[54] ABNORMALITY DETECTOR FOR MOTOR ASSISTED STEERING APPARATUS

[75] Inventors: Hiroshi Nakashima, Nishio; Naoji Sakakibara, Chiryu; Takehiko Fushimi, Kariya, all of Japan

[73] Assignee: Aisin Seiki Kabushikikaisha, Kariya, Japan

[21] Appl. No.: 146,742

[22] Filed: Jan. 21, 1988

[30] Foreign Application Priority Data

Jan. 22, 1987 [JP] Japan ................... 62-13048

[51] Int. Cl.$^4$ ............................. B62D 5/04
[52] U.S. Cl. .................................... 180/79.1
[58] Field of Search ............. 180/79.1, 141, 142, 180/143, 133

[56] References Cited

U.S. PATENT DOCUMENTS

| 4,569,411 | 2/1986 | Morishita et al. | 180/142 |
| 4,611,682 | 9/1986 | Yasuda et al. | |
| 4,619,338 | 10/1986 | Higashi et al. | 180/142 |
| 4,724,917 | 2/1988 | Naito et al. | 180/79.1 |
| 4,736,810 | 4/1988 | Morishita et al. | 180/79.1 |

FOREIGN PATENT DOCUMENTS

| 59-48269 | 3/1984 | Japan | 180/79.1 |
| 60-209365 | 10/1985 | Japan | |
| 62-12458 | 1/1987 | Japan | 180/79.1 |
| 62-12460 | 1/1987 | Japan | 180/79.1 |
| 62-29467 | 7/1987 | Japan | |

Primary Examiner—John A. Pekar
Attorney, Agent, or Firm—Banner, Birch, McKie & Beckett

[57] ABSTRACT

A motor assisted steering apparatus has its wheels oriented with respect to a car body in response to a combination of a steering force which is supplied by a manual operation and a driving force developed by an electric motor which is energized in accordance with the steering force. The existence of an abnormality is annunciated when the relationship between the manual steering force and the operational condition of the motor deviates from a predetermined relationship. For example, the existence of an abnormality is annunciated when the motor is energized even though a steering wheel is not substantially operated, when the motor is energized for rotation in a direction which causes the wheels to be turned to the left even though the steering wheel is turned to the right or vice versa. The existence of such abnormality is detected by monitoring the manual steering force and the operational condition of the motor, without requiring any addition of sensors which have no direct connection with the operation of the apparatus.

20 Claims, 9 Drawing Sheets

ABNORMALITY DETECTOR FOR MOTOR ASSISTED STEERING APPARATUS

BACKGROUND OF THE INVENTION

The invention relates to a motor assisted steering apparatus which permits a steering force required to operate a steering wheel or the like to be reduced by utilizing an assistance from a motor, in particular, to an abnormality detector for motor assisted steering apparatus which detects an abnormal operating condition of the motor.

Considering an automobile, for example, when a steering wheel is turned either to the left or right, such motion is transmitted to a steering mechanism to direct the orientation of front wheels either to the left or right. Assuming a constant road condition, the magnitude of a force which will be required to turn the steering wheel will increase as the running speed of the automobile decreases, requiring a maximum force when the automobile is at rest. However, in many instances, a turning motion of the steering wheel through an increased stroke is required when the automobile is at rest or running at low speeds. For this reason, there has been proposed a power assisted steering apparatus which facilitates an operation of a steering wheel by utilizing a power assistance in the steering system. In such apparatus, an auxiliary drive force which depends on the turning force applied to the steering wheel is transmitted to the steering mechanism to assist in the operation of the steering wheel. The power assisted steering apparatus may be either electrical or hydraulic type depending on the kind of means which is used to develop the auxiliary drive force. A majority of apparatus which is currently incorporated in automobiles is of the latter type.

However, a power assisted steering apparatus of hydraulic type requires various components such as a hydraulic pump, control valve, hydraulic cylinder or the like, which must be connected together through hydraulic pipings, resulting in an increased size of the apparatus. In addition, a number of mounting operations are required due to the presence of hydraulic pipings. For this reason, attention is recently being directed to a motor assisted steering apparatus which is simple in construction and rends itself to a reduced size construction.

A basic idea of such motor assisted steering apparatus is disclosed in Japanese Laid-Open Patent Application No. 63,265/1984. In this apparatus, a turning force applied to a steering wheel is detected by a torque sensor, and an electric motor is energized in accordance with the detected magnitude of the torque. The turning force applied to the steering wheel is combined with the drive from the motor before their sum is transmitted to the steering mechanism.

The reliability of an electrical control system is of a great importance in the motor assisted steering apparatus of the kind described. In the event a circuit which drives the motor becomes short-circuited due to oscillations of the automobile or a temperature rise, the wheels may be directed independently from an operation of the steering wheel by the driver. Accordingly, a research and development of motor assisted steering apparatus has been conducted along with means to prevent its malfunctioning.

By way of example, in Japanese Laid-Open Patent Application No. 209,365/1985, an energizing current for the motor which develops the auxiliary drive force is monitored, and the energization of the motor is inhibited whenever the energizing current exceeds a threshold value which is established in accordance with a vehicle speed. It is reasonable that the detection of an abnormal energization of the motor is based upon a comparison against a threshold value which depends on a vehicle speed inasmuch as the driving force which is required to direct wheels through the steering mechanism is closely related to the vehicle speed. However, in the arrangement described, no attention has been paid to the turning force applied to the steering wheel. Specifically, the occurrence of an abnormality is not recognized if the energizing current of the motor is equal to or less than the threshold value which depends upon the vehicle speed. Accordingly, the motor may be energized with an energizing current equal to or less than the threshold value even if the steering wheel is not operated.

SUMMARY OF THE INVENTION

It is an object of the invention to provide an abnormality detector for motor assisted steering apparatus which accurately detects an abnormality in the relationship between a steering operation by a driver and the energization of a motor.

The above object is accomplished in accordance with the invention by an abnormality detector for motor assisted steering apparatus in which the orientation of wheels relative to a car body is controlled by a combination of a steering force which is supplied by a manual operation and a drive force developed by an electric motor which is energized in accordance with the steering force; the abnormality detector comprising input detecting means for detecting a steering force fed to input means, operational status detecting means for detecting operation information which represents an operational status of an electric motor, and abnormality annunciator means for monitoring steering force information and operation information and for annunciating the existence of an abnormality when a correlation between such information is different from a preset correlation.

In a motor assisted steering apparatus of the kind described, a relationship between a steering force responsive to a manual input and a drive force to be developed by an electric motor is clearly defined to a high degree. Stated differently, the correlation between steering force information and operation information is previously determined, and the motor is energized and deenergized in accordance with such correlation. Accordingly, by annunciating the existence of an abnormality when the detected steering force information and operation information deviate from the predetermined correlation, any abnormality in the relationship between a steering operation by a driver and the energization of the motor can be accurately detected.

For example, if one chooses a heavy energization of a motor in response to a steering force only when the steering force exceeds a given range, the existence of an abnormality is annunciated if the operation information indicates a drive force developed by the motor when the steering force information indicates the use of a steering force having an increased magnitude, which however remains within the given range.

By way of another example, if the operation information indicates that a drive force causing the wheels to be redirected to the left is being developed by the motor when the steering force information indicates the application of a steering force which is intended to redirect the wheels to the right with respect to the car body, or if the operation information indicates that a drive force causing the wheels to be redirected to the right is being developed by the motor when the steering force information indicates the application of a steering force which causes the wheels to be redirected to the left with respect to the car body, the existence of an abnormality is annunciated.

Alternatively, the existence of an abnormality is established when operation information indicates a simultaneous energization of the motor for rotation in both the forward and the reverse direction.

In this manner, in accordance with the invention, a monitoring is performed to see if a motor assisted steering apparatus is operating as designed, eliminating in principle the need for any additional elements such as a vehicle speed sensor as taught in Japanese Laid-Open Patent Application No. 209,365/1985, for example.

Other objects and features of the invention will become apparent from the following description of an embodiment thereof with reference to the drawings.

BRIEF DESCRIPTION OF THE DRAWINGS

FIG. 2 is a cross section, to an enlarged scale, of a reduction gearing 9 shown in FIG. 1, taken along the line II—II shown in FIG. 3a;

FIG. 10 graphically shows an example of waveform which illustrates an input/output operation of block B11 shown in FIGS. 5 and 6a.

DETAILED DESCRIPTION OF EMBODIMENT

Figure 1:
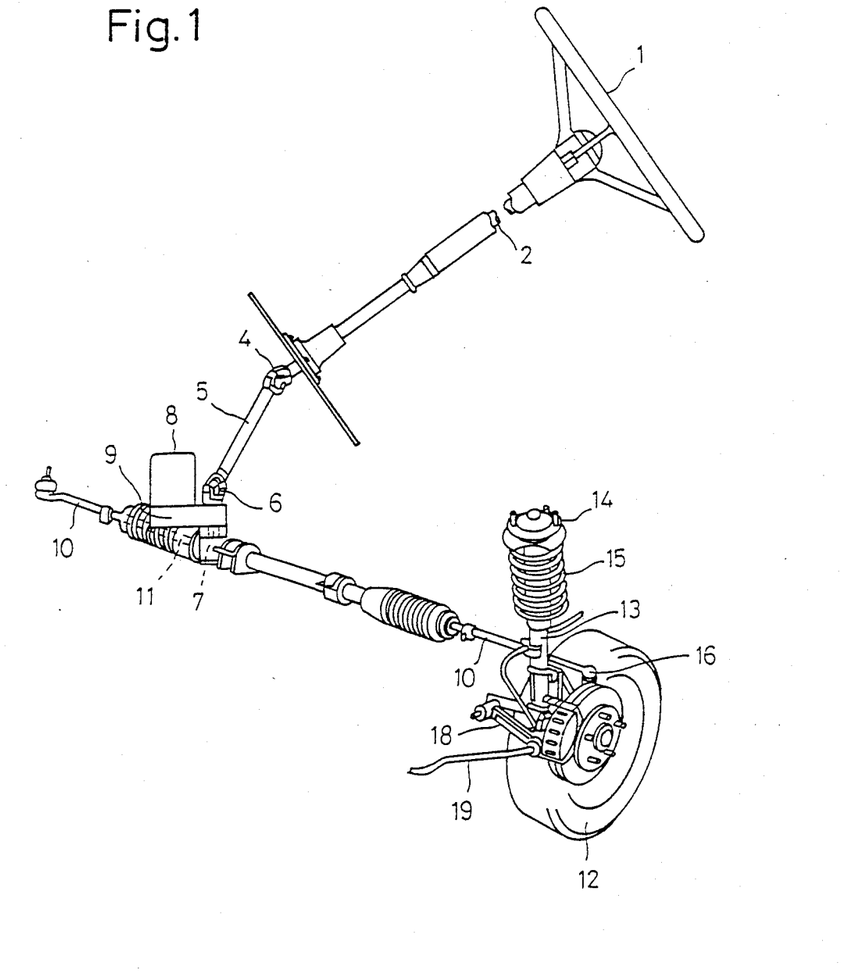
FIG. 1 is a pespective view of a mechanical construction of a motor assisted steering apparatus in which an embodiment of the invention is employed.

FIG. 1 shows a general arrangement of a mechanism used in one embodiment of the invention. A steering wheel 1 is fixedly connected with a first steering shaft 2, which is coupled to a second steering shaft 5 by means of a first universal joint 4. A second universal joint 6 couples the second steering shaft 5 to a rod 7, which is in turn coupled to an output shaft (21, to be described later) of a reduction gearing 9 on which a pinion gear (22, to be described later) is formed. The pinion gear (22) meshes with a rack 11 which is fixedly mounted on a tie rod 10. The tie rod 10 is coupled to a steering knuckle arm 16 of a wheel 12. The wheel 12 has an axle which is fastened to a shock absorber 13 having a suspension upper support 14 which is coupled to a car body, not shown. A coiled spring 15 is connected between the upper support 14 and the axle to serve as a vibration buffer. A lower suspension arm is shown at 18 and a stabilizer bar is shown at 19.

Figure 2:
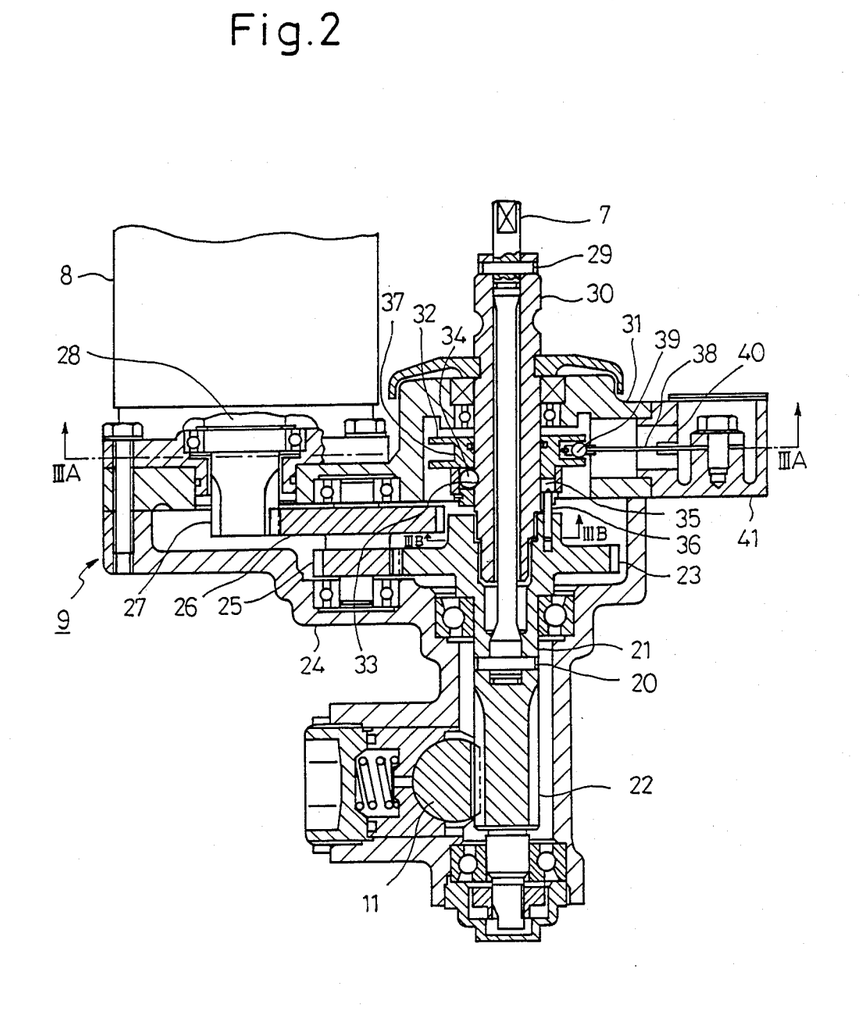

The internal construction of the reduction gearing 9 is shown in FIG. 2. A sleeve 30 is secured to the rod 7, slightly below the upper end thereof, by means of a pin 29. The sleeve 30 is rotatably mounted in an upper reduction gearing case 31. The rod 7 extends through the sleeve 30 and into an output shaft 21, with its bottom end being secured to the output shaft 21 by means of a pin 20. The output shaft 21 is rotatably mounted in a lower reduction gearing case 24, and is formed with a pinion gear 22 on its lower end, which meshes with the rack 11. Accordingly, as the steering wheel 1 (see FIG. 1) rotates, the output shaft 21 is driven for rotation through a path including the first steering shaft 2, the first universal joint 4, the second steering shaft 5, the second universal joint 6 and the rod 7, whereby the rack 11 meshing with the pinion gear 22 on the output shaft 21 is driven in a direction perpendicular to the plane of the drawing of FIG. 2 or in a direction in which the tie rod 10 extends, as viewed in FIG. 1, thus changing the direction of the wheel 12 (see FIG. 1).

The output shaft 21 includes a hollow upper end around which a ring gear 23 is formed for meshing engagement with an intermediate gear 25 which is rotatably mounted within the case 24. Another intermediate gear 26 is coaxial and integral with the intermediate gear 25 and meshes with an input gear 27. The input gear 27 is fixedly mounted on an output rotating shaft 28 of an electric motor 8. When the motor 8 is energized, a gear train 27-26 and 25-23 is effective to cause the output shaft 21 to rotate, whereupon the rack 11 meshing with the pinion gear 22 on the output shaft 21 is driven in a direction perpendicular to the drawing of FIG. 2 or in a direction in which the tie rod 10 extends, as viewed in FIG. 1, thus changing the direction of the wheel 12 (see FIG. 1).

In this manner, the direction of the wheel 12 can be changed in response to either the rotation of the steering wheel 1 or the energization of the motor 8 for rotation in either forward or reverse direction.

Figure 4:
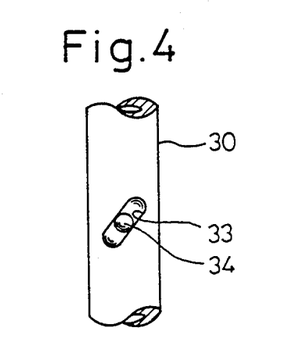
FIG. 4 is a plan view of a sleeve 30 shown in FIGS. 2 and 3a, illustrating the outside surface.

A wheel 32 is rotatably mounted on the sleeve 30 or the sleeve 30 extends through the wheel 32. As shown in FIG. 4, the external surface of the sleeve 30 is formed with a groove 33 having a rounded bottom and which extends at an angle with respect to the center axis of the sleeve 30, with a ball 34 being received in the groove 33 and held in place by the wheel 32. The wheel 32 is formed with a groove 35 of a reduced width, into which the upper end of a pin 36 which is fixedly mounted on the top end of the output shaft 21 extends. The engagement between the groove 35 and the pin 36 causes an integral rotation of the output shaft 21 and the wheel 32.

An area of the rod 7 which is covered by the sleeve 30 defines a torsion bar which will be twisted in accordance with a load upon the output shaft 21. The twist manifests itself as a differential angle of rotation between the sleeve 30 secured to the upper end of the rod 7 and the wheel 32 which rotates integrally with the output shaft 21 secured to the lower end of the rod 7. A differential rotation or twist of the sleeve 30 with respect to the wheel 32 causes the groove 33, formed in the sleeve 30 at an angle with respect to the center axis thereof, to drive the ball 34 either upward or downward, whereby the wheel 32 which carries the ball 34 moves upward or downward.

In a region where the sleeve 30 extends into the hollow portion of the output shaft 21, there is provided a safety lock mechanism which prevents an excessive twisting of the rod 7. Specifically, referring to FIG. 3b which is a section taken along the line IIIB—IIIB shown in FIG. 2, the mechanism comprises an outer peripheral surface of the sleeve 30 and an inner peripheral surface of the output shaft 21 which defines a hollow portion, both of which are of analogous non-circular configuration in section. Thus, when a twist between the sleeve 30 and the output shaft 21 exceeds a given limit, the outer peripheral surface of the sleeve 30 abuts against the internal peripheral surface of the output shaft 21 to restrict a relative rotation of the sleeve 30 with respect to the output shaft 21.

On the other hand, the wheel 32 is formed with an annular groove 37 in which a ball 39 is engaged, the ball 39 being rotatably carried by one end of a resilient blade 38, the other end of which is secured to a sensor bracket 41 which is threadably mounted on the upper casing 31 of the reduction gearing. Accordingly, a shift of the wheel 32 either upward or downward acts through the groove 37 and the ball 39 to warp the resilient blade 38 either upward or downward.

Figure 3A:
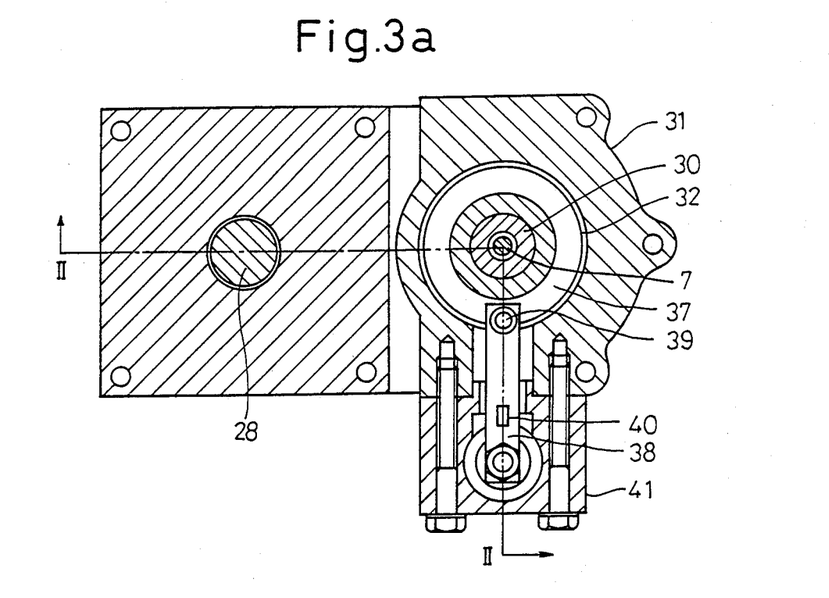
FIG. 3a is a section taken along the line IIIA—IIIA shown in FIG. 2.
Figure 3B:
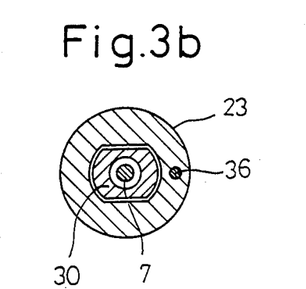
FIG. 3b is a section taken along the line IIIB—IIIB shown in FIG. 2.

Referring to FIG. 3a which is a section taken along the line IIIA—IIIA shown in FIG. 2, a pair of strain detecting elements are applied to the front and the back surface of the resilient blade 38 and are connected in series to each other to form a torque sensor 40. Each of such strain detecting elements exhibits a resistance which changes as it is strained by the resilient blade 38 when the latter is warped either upward or downward as a result of an upward or downward shift of the wheel 32, which is transmitted through the groove 37 and the ball 39, in response to a steering torque applied to the steering wheel 1 which causes the rod 7 to twist. Accordingly, a suitable voltage is applied to the torque sensor 40 to derive the magnitude of a steering torque in terms of a potential at the junction between the pair of strain detection elements. As graphically shown in FIG. 8, the potential is substantially in direct proportion to the magnitude of the steering torque applied, but the safety lock mechanism provided between the sleeve 30 and the output shaft 31 as mentioned above restricts the twisting of the rod 7, whereby the potential saturates to given values as the steering torque reaches a given value.

Figure 5:
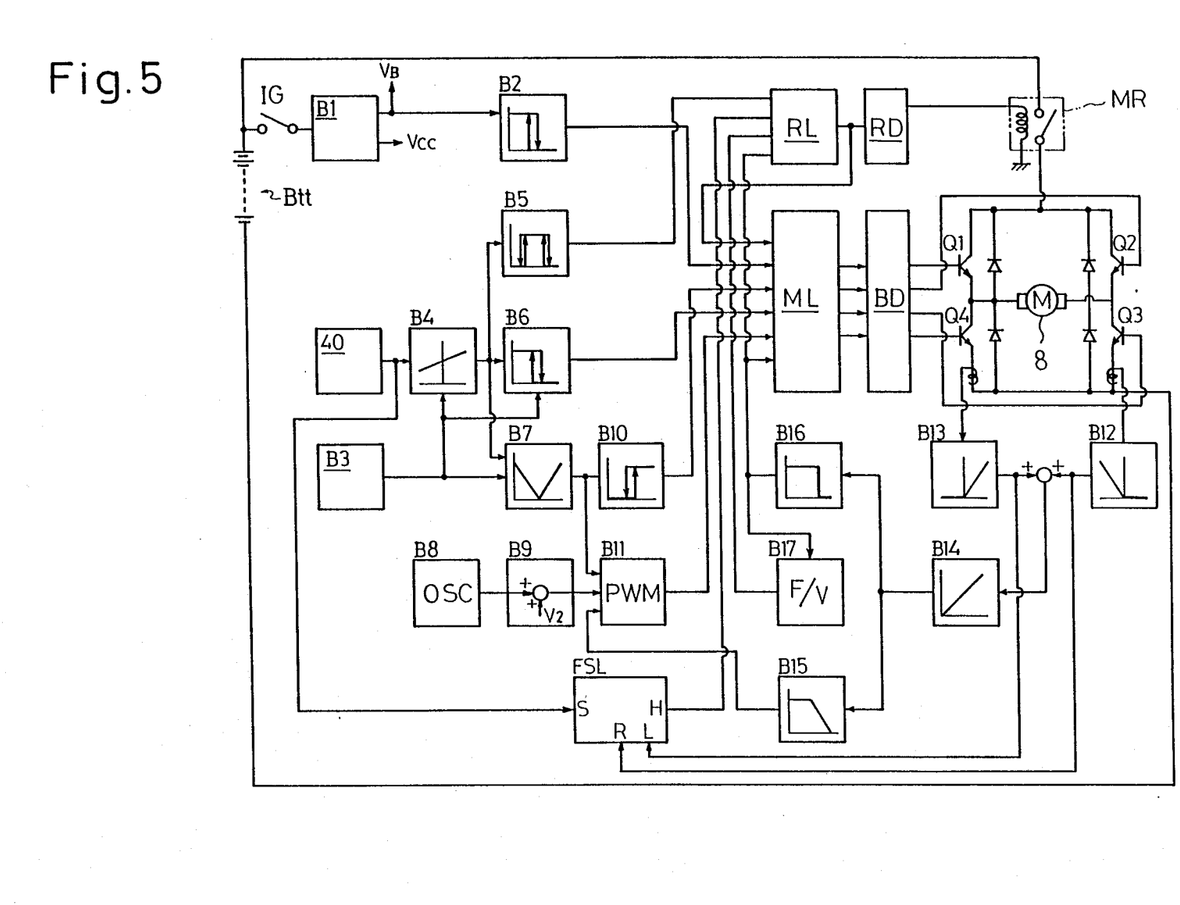
FIG. 5 is a block diagram of an electrical control system used in the apparatus shown in FIG. 1.
Figure 6A:
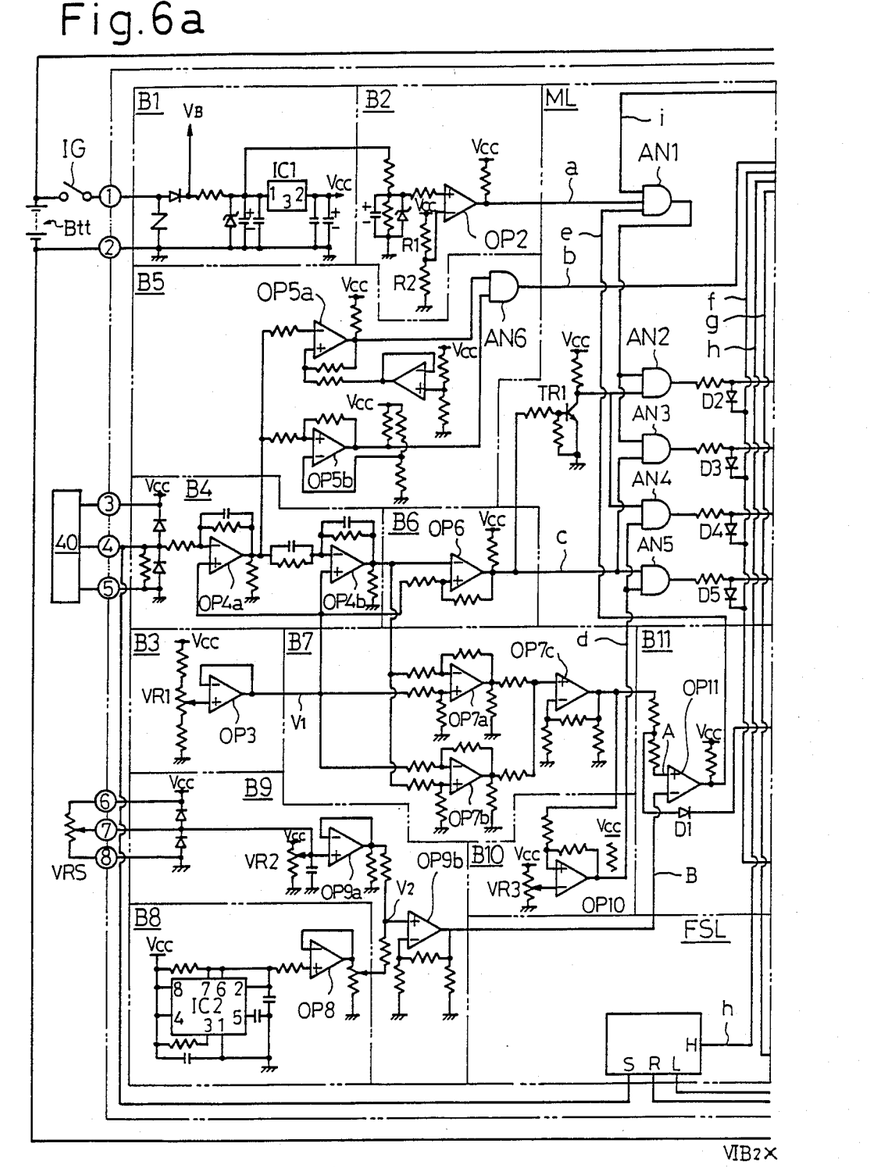
FIGS. 6a, 6b and 7 are detailed circuit diagrams of certain blocks shown in FIG. 5.
Figure 6B:
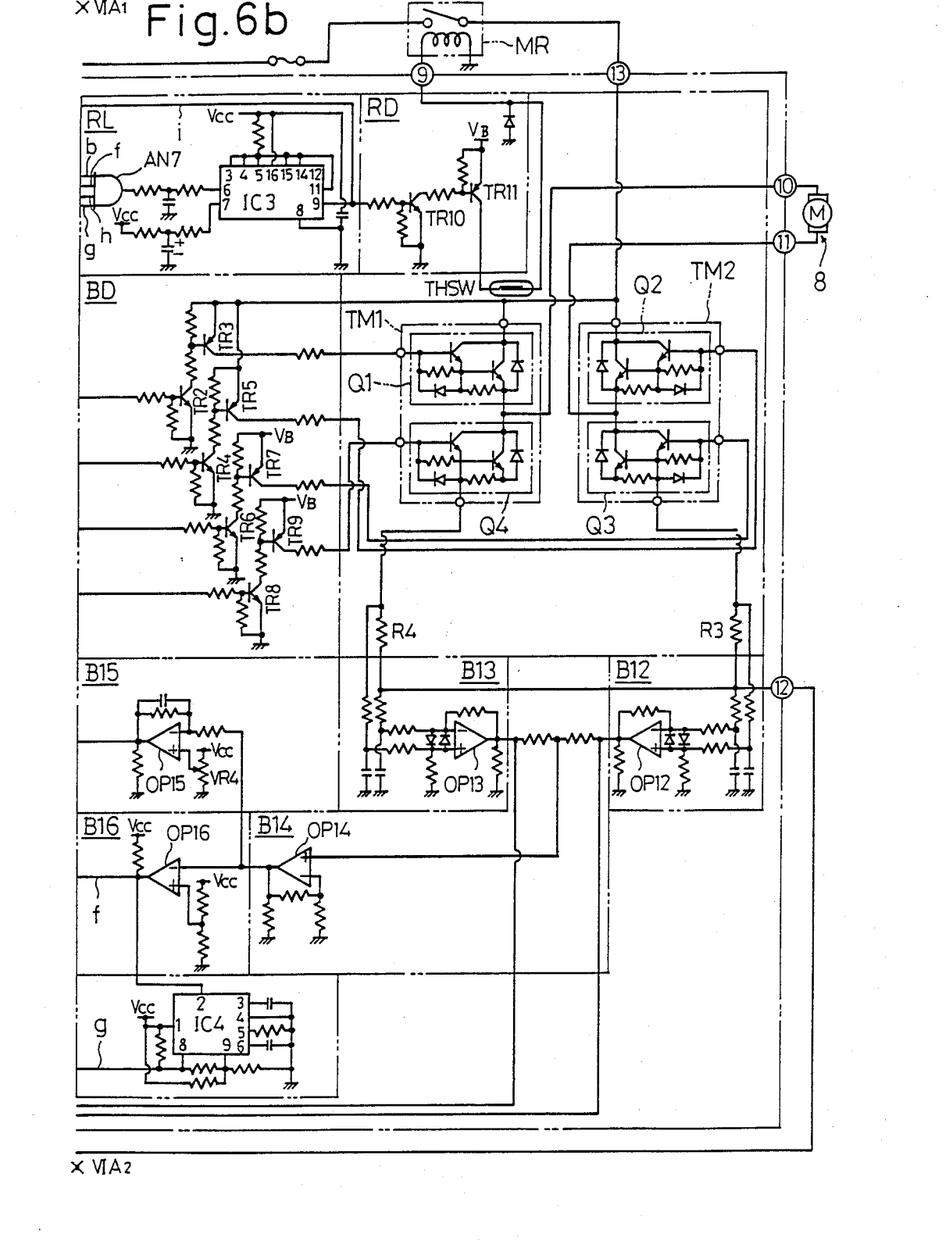

FIG. 5 shows a block diagram of an electrical control system which energizes the motor 8 for rotation in accordance with an output signal from the torque sensor 40. Detailed circuit diagrams of several blocks are specifically shown in FIGS. 6a, 6b and 7. It is to be understood that a graphical representation in each block shown in FIG. 5 represents an electrical input/output response of that block where the abscissa represents an input level and the ordinate an output level. It is also to be noted that FIGS. 6a and 6b are combined together to define a single entire diagram by joining points VIB1 and VIB2 of FIG. 6a with points VIA1 and VIA2 of FIG. 6b, respectively. The individual blocks will be described specifically with referene to these Figures.

Block B1

This represents a constant voltage circuit which essentially comprises an integrated circuit IC1, which comprises μPC14305H in the present embodiment. When an ignition switch IG is turned on, a voltage $V_B$ output from an onboard battery Btt is applied thereto, and the circuit feeds a constant voltage Vcc to various blocks.

Block B2

This block is formed as a comparator comprising an operational amplifier op2. The comparator provides a supply voltage monitor signal a which assumes a high level H or low level L when a voltage representing a battery voltage $V_B$ as divided by a suitable resistive voltage divider is greater or less than a voltage which is derived from a constant voltage Vcc through a voltage divider comprising resistors R1 and R2. It is to be noted that a hysteresis response is incorporated into the comparator to prevent a chattering between the high and the low level. In this manner, any reduction in the battery voltage $V_B$ is detected. Since the battery voltage $V_B$ is supplied to the comparator through a smoothing circuit, a momentary fluctuation cannot cause a malfunctioning.

Block B3

This represents a circuit which establishes a first reference voltage $V_1$, which is chosen to be equal to a neutral potential from the torque sensor 40, that is, the potential which prevails when no torque is applied thereto, by adjusting a variable resistor VR1. The first reference voltage $V_1$ is fed to the blocks B4, B6 and B7.

Block B4

This represents a PID (proportional-plus-integral-plus-derivative) compensation circuit essentially comprising operational amplifiers op4a, op4b and operating to smooth out a fluctuation in an output signal from the torque sensor 40 caused by a mechanical lag of the steering system. The first reference voltage $V_1$ is applied from block B3 to this block, which linearly amplifies a difference between a d.c. input and the voltage $V_1$. In the description to follow, an output from this block B4 will be referred to as a torque detection signal.

Block B5

This represents a window comparator comprising a pair of operational amplifiers op5a, op5b and AND gate AN6. It operates to detect a torque detection signal, or an output signal from an integrating circuit which essentially comprises the operational amplifier op4a in a prestage to block B4, which goes beyond a preset range.

Figure 8:
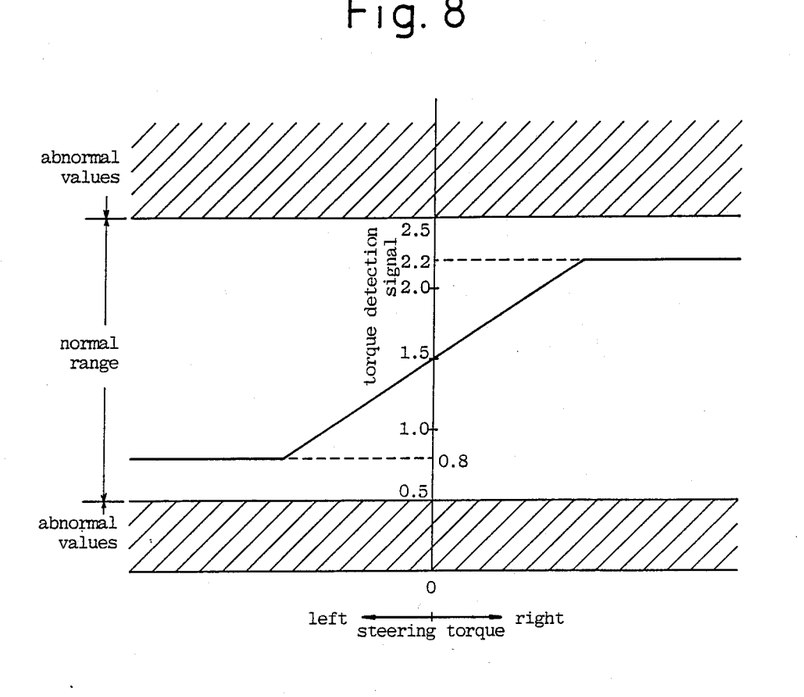
FIG. 8 graphically shows a correlation between a steering torque applied from a steering wheel 1 of the apparatus shown in FIG. 1 and a torque detection signal.

As mentioned previously, since the twisting of the rod 7 is restricted by the action of the safety lock mechanism provided between the sleeve 30 and the output shaft 21, the torque detection signal supplied to this block has a maximum value of 2.2 V and a minimum value of 0.8 V, as indicated in FIG. 8 (the signal being equal to 1.5 V when no steering torque is applied). Accordingly, a normal detection range is chosen to be from 0.5 to 2.5 V, and if any torque detection signal supplied to this block exceeds 2.5 V, the comparator comprising the operational amplifier op5a delivers a low level L (an open collector output), and when the torque detection signal reduces below 0.5 V, the comparator comprising the operational amplifier op5b delivers a low level L (an open collector output). These outputs are combined by an AND gate AN6 to provide a sensor abnormality detection signal b. Thus, the sensor abnormality detection signal b indicates the normal operation of the torque sensor 40 when it assumes a high level H, and indicates an abnormality of the torque sensor 40 when it assumes a low level L. As before, a hysteresis response is incorporated into the respective comparators to prevent a chattering.

Block B6

This represents a comparator essentially comprising an operational amplifier op6 and comparing the torque detection signal against the first reference voltage $V_1$ to deliver a rotation signal c which indicates the direction in which the steering wheel 1 has been turned. This circuit also exhibits a hysteresis response in order to prevent a chattering. Specifically, the rotation signal b will be at its low level L (open collector output) representing a right turning of the steering wheel 1 when the torque detection signal is close to or above the first reference voltage $V_1$, and will be at its high level H representing a left turning of the steering wheel 1 when the torque detection signal is close to or less than the first reference voltage $V_1$.

Block B7

This block comprises a first differential amplifier essentially comprising an operational amplifier op7a, a second differential amplifier essentially comprising an operational amplifier op7b and a linear amplifier essentially comprising an operational amplifier op7c. The first differential amplifier amplifies a difference of the torque detection signal below the first reference voltage $V_1$, (corresponding to a left turning of the wheel 1), the second differential amplifier amplifies a difference of the torque detection signal over the first reference voltage $V_1$ (corresponding to a right turning of the wheel 1), and these outputs are added together to be linearly amplified by the linear amplifier. An output signal from the block B7 represents the absolute magnitude of the torque detection signal, or more strictly, the absolute magnitude of the difference with respect to the first reference voltage $V_1$ (hereafter referred to as "absoute torque signal"), and is applied to blocks B10 and B11.

Block B8

This represents a sawtooth wave generator essentially comprising an integrating circuit IC2, which is µPC1555 in the present embodiment.

Block B9

This represents a summer which sums a second reference voltage $V_2$ with a sawtooth wave output from the block B8, thus shifting the latter. The second reference voltage $V_2$ is controlled by a steering force controlling variable resistor VRs which is located on an instrument panel.

Block B10

This represents a comparator essentially comprising an operational amplifier op10 which presets a dead band. In this circuit, the absolute torque signal or an output from block B7 is compared against a voltage which is preset by a variable resistor VR3, and if the absolute torque signals is equal to or greater than the pc preset voltage, the circuit delivers a response signal d of a high level (open collect output) while the response signal d will be at its low level when the absolute torque signal is less than the preset voltage. The response signal d represents the presence or absence of a response when it is at a high level H and a low level L, respectively. A hysteresis response is also introduced into this circuit in order to prevent a chattering.

Block B11

Figure 10:
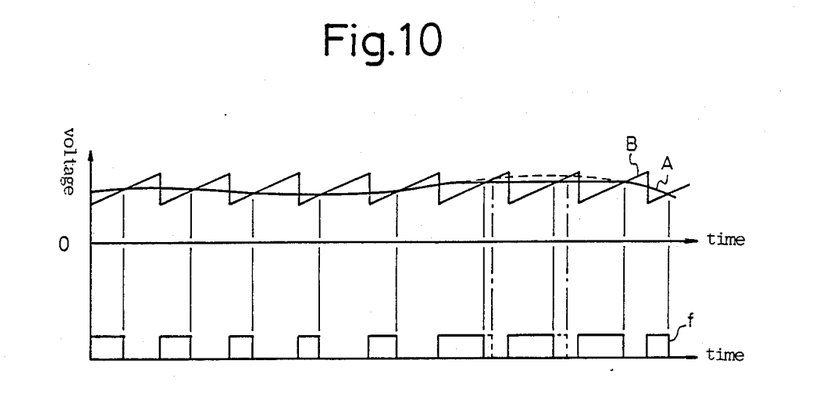

This represents a comparator essentially comprising an operational amplifier op11, and operates to compare the absolute torque signal A after it has been clamped by a clamp signal delivered from block B15 in a manner to be described later, against the sawtooth wave B delivered as an output from block B9 after it has been shifted. FIG. 10 shows one output mode where a PWM signal e assumes a high level H (open collector output) when the signal A is greater than the signal B, and assumes a low level L in the opposite instance.

A voltage preset by the variable resistor VR3 of the block B10 is chosen to be lower than the minimum value of the sawtooth wave B in order to prevent the PWM signal d from assuming an H level unless the absolute torque signal goes beyond the dead band. This produces a smoothed drive of the motor 8.

Blocks B12 and B13

These represent a current detector of an identical construction. Block B12 includes a differential amplifier essentially comprising an operational amplifier op12 which operates to amplify a voltage developed across a shunt resistor R3. Block B13 includes a differential amplifier comprising an operational amplifier op13 which amplifies a voltage across a shunt resistor R4. A current having a maximum value of about 30 amperes flows through the resistors R3 and R4, and accordingly, the input of each amplifier is provided with a protective circuit.

Block B12 detects the energization current for the motor 8 when it is energized for rotation in the forward direction (which drive is transmitted through the above mechanism to drive wheels 12 in a direction to turn the automobile to the right) while block B13 detects the energization current for the motor 8 when it is energized for rotation in the reverse direction (which drive is transmitted through the above mechanism to drive the wheels 12 in a direction to turn the automobile to the left).

Block B14

This represents a non-inverting amplifier essentially comprising an operational amplifier op14, and operating to sum outputs from blocks B12 and B13 to provide a current detection signal at its outputs.

Block B15

This represents an integrating circuit essentially comprising an operational amplifier op15 and operating to average the current detection signal delivered as an output from block B14, thus delivering a clamp signal. When the current detection signal is higher than a voltage established by a variable resistor VR4, the clamp signal is reduced by an amount corresponding to the difference therebetween. In this manner, the greater the energizing current of the motor 8, the lower the value which the clamp signal assumes. The clamp signal is applied to the cathode of a diode D1 (in block B11) to clamp the absolute torque signal or the output from the block B7.

Figure 9:
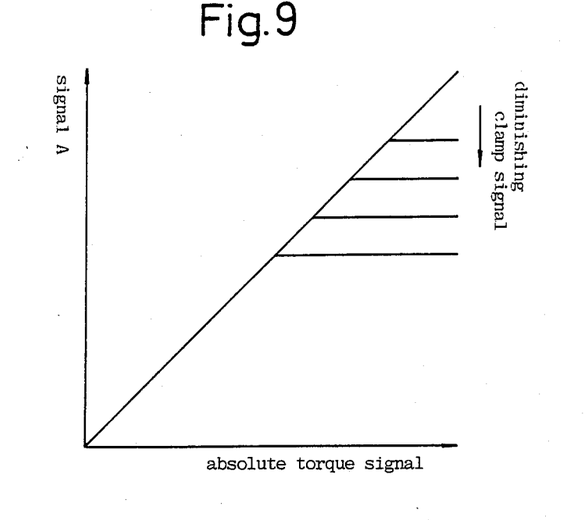
FIG. 9 graphically shows a correlation between an absolute torque signal and a clamped absolute torque signal.

The relationship between the clamped signal A, the absolute torque signal and the clamp signal is graphically shown in FIG. 9. Referring to FIG. 9, when the clamp signal is sufficiently high, the signal A represents the absolute torque signal. On the other hand, as the clamp signal diminishes, the maximum value of the signal A also decreases. Accordingly, if the absolute torque signal is increased in a manner as indicated by broken lines in FIG. 10, it is clamped by the clamp signal as indicated by a solid-line curve in FIG. 10, and accordingly the pulse width of PWM signal d cannot increase beyond that determined by the clamp signal. This means that the energization level of the motor 8 is limited as will be further described later.

Block B16

This represents an abnormality detector circuit essentially comprising an operational amplifier op18 and operating to detect an abnormality of the energizing current of the motor 8. It in effect operates as a comparator which compares the current detection signal against a preset value. If the current detection signal is equal to or less than a given voltage which is preset by resistors, PWM blocking signal e assumes a high level H (open collector output) indicating non-occurrence of a blocking operation. However, when the current detection signal exceeds the preset voltage, the signal e changes to its low level, indicating the occurrence of a blocking operation. The signal e is applied to a main logic ML and a relay logic RL.

Block B17

This includes an integrated circuit IC4, which is MB4207 in the present embodiment, including a frequency-to-voltage converter. While its arrangement will be described in detail later, it delivers an abnormal oscillation signal g which assumes a low level L in response to the oscillation of the block B16.

Block RL

This block comprises a logic circuit including a four input AND gate AN7 and a latch circuit IC3. A sensor abnormality detection signal b, PWM blocking signal f, an abnormal oscillation signal g and a fail-safe abnormality signal h, which will be described later, are supplied to the gate AN7. The gate delivers a high level H only when all of these input signals assume a high level H, indicating the absence of any abnormality. However, if one of these input signals assumes a low level indicating the occurrence of an abnormality, the gate delivers a low level L. An output from the gate AN7 is applied to a trigger input terminal 6 (low active) of the latch circuit IC3.

The latch circuit IC3 is reset as the ignition switch IG is turned on to deliver a high level H, and is triggered by the falling edge of an output applied to its trigger input terminal 6 or an output from the gate AN7 as it changes to its low level L, measuring a time interval during which it remains at the low level L. When the time length exceeds a given limit, the latch circuit delivers a low level L and remains at such low level until the ignition switch IG is turned on again. In the subsequent description, an output from the latch circuit will be referred to as a supply interrupt signal i, which signal is applied to the relay driver RD and a main logic circuit ML.

Block RD

This block represents a relay driver comprising transistors TR10 and TR11. When the supply interrupt signal i assumes its H level, the relay driver energizes the main relay MR which is connected in the supply line leading to the motor 8 (or the line connecting the emitters of power transistors Q1 and Q2, to be described later, with the positive terminal of the battery Btt). When the supply interrupt signal i is at its low level L, the driver deenergizes the main relay. A switch THSW is connected in the supply line of the main relay MR, and comprises a thermal switch mounted on the heat dissipating plate of power transistors Q1, Q2, Q3 and Q4 for preventing an overheating. Whenever at least one of transistors Q1 to Q4 becomes overheated to cause the temperature of the heat dissipating plate to exceed a given value, this switches open to disconnect the supply line to the main relay MR.

Block ML

This block represents a logic circuit essentially comprising AND gates AN1, AN2, AN3, AN4 and AN5. The supply voltage monitor signal a, PWM signal e, and the supply interrupt signal i are input to the gate AN1 which delivers a high level H when all the inputs assume a high level H, and which delivers a low level L when any of the inputs assumes a low level L. In other words, the gate AN1 is effective to allow the passage of the PWM signal e when both the supply voltage monitor signal a and the supply interrupt signal i both assume a high level H, but interrupts the PWM signal whenever at least one of them assumes a low level L. An output from the gate AN1, which will be hereafter referred to as a conditional PWM signal, is applied to one input of each of the gates AN2 and AN3.

A rotation signal c as inverted by the transistor TR1 is supplied to the other input of the gate AN2. As mentioned previously, the rotation signal c assumes a low level L when the steering wheel 1 is turned to the right (causing the automobile to turn to the right), and assumes a high level H when the steering wheel 1 is turned to the left (causing the automobile to turn to the left). Thus, the gate AN2 passes the conditional PWM signal when the steering wheel 1 is turned to the right, but blocks the conditional PWM signal when the steering wheel is turned to the left.

The rotation signal c is also supplied to the other input of the gate AN3. Thus, the gate AN3 passes the conditional PWM signal when the steering wheel 1 is turned to the left, but blocks it when the steering wheel is turned to the right. The rotation signal c as inverted by the transistor TR1 is also fed to one input of the gate AN4, the other input of which receives the response signal e which is output from the block B10. Thus, the gate AN4 delivers a high level H if the response signal d assumes a high level H when the steering wheel 1 is turned to the right. The rotation signal c is also fed to one input of the gate AN5, the other input of which receives the response signal d. Thus, the gate AN5 delivers a high level H if the response signal d assumes a high level H when the steering wheel 1 is turned to the right.

Diodes D2, D3, D4 and D5 are forwardly connected to the output terminals of the gates AN2, AN3, AN4 and AN5, respectively, with the PWM blocking signal f applied to the cathode of the respective diodes. Thus, an output from each gate is applied to the base driver BD only when the PWM blocking signal f assumes a high level H.

Block BD

The base driver BD comprises a base driving circuit associated with the power transistor Q1 and including transistors TR2 and TR3; a base driving circuit associated with power transistor Q2 and including transistors TR4 and TR5; a base driving circuit associated with power transistor Q3 and including transistors TR6 and TR7; and a base driving circuit associated with power transistor Q4 and including transistors TR8 and TR9. A level conversion takes place in this block.

Blocks TM1 and TM2

These blocks include power transistors Q1, Q2, Q3 and Q4 which operate to energize the motor 8 for rotation in either forward or reverse direction. Considering each transistor circuit as represented by a single transistor in the manner illustrated in FIG. 5, the collectors of the transistors Q1 and Q2 are connected through the contacts of the main relay MR to the positive terminal of the onboard battery Btt while the emitters of the transistors Q3 and Q4 are connected through the shunt resistor R4 and R3 to the negative terminal of the onboard battery Btt.

During a normal operation or when the supply voltage monitor signal a, the sensor abnormality detection signal b and the supply interrupt signal i do not indicate the existence of any abnormality and the PWM blocking signal is not blocking, the power transistor Q1 is turned on and off in response to the PWM signal e as the steering wheel 1 is turned to the right, and the power transistor Q3 is turned on and off by the response signal d. When the steering wheel 1 is turned to the left, the power transistor Q2 is turned on and off by the PWM signal e, while the power transistor Q4 is turned on and off by the response signal d.

It will be seen that the motor M is energized for rotation in the forward direction when the power transistors Q1 and Q3 are on and energized for rotation in the reverse direction when the power transistors Q2 and Q4 are on.

Table 1 indicated below summarizes the signals applied to the bases of the power transistors Q1, Q2, Q3 and Q4 in response to the input signals a, c, d, e, f and i from the main logic ML. In Table 1, "*" represents "don't care", meaning either high level H or low level L may do; "-" represents "don't determine", "⊓⌴" indicates a PWM control; and "H" or "L" appearing in the columns of the input signals a, c, d, e, f and i represents a high level H or low level L input (IC level); and "H" or "L" in the columns of the signals applied to the bases of the power transistors Q1, Q2, Q3 and Q4 indicates a high level H (on level) or a low level L (cutoff level) input, respectively.

TABLE 1

| input signals | | | | | | base signals applied | | | |
|---|---|---|---|---|---|---|---|---|---|
| a | c | d | e | f | i | Q1 | Q2 | Q3 | Q4 |
| L | * | * | * | * | * | L | L | — | — |
| * | * | * | * | L | * | L | L | L | L |
| * | * | * | * | * | L | L | L | — | — |
| | | | | | | | L | | |
| H | L | L | ⊓⌴ | H | H | ⊓⌴ | L | L | L |
| H | L | H | ⊓⌴ | H | H | ⊓⌴ | L | H | L |
| H | H | L | ⊓⌴ | H | H | L | ⊓⌴ | L | L |
| H | H | H | ⊓⌴ | H | H | L | ⊓⌴ | L | H |

As mentioned previously, when the energizing current for the motor 8 becomes abnormally high, the PWM blocking signal f is changed to its low level in the block B16. This causes all the transistors Q1 to Q4 to be turned off as indicated in Table 1 above. Accordingly, the energizing current for the motor 8 reduces rapidly, whereupon the PWM blocking signal f changes to its high level in the block B16. However, in the presence of some abnormality such as a short-circuiting of a power transistor, the energizing current begins to increase immediately unless such abnormality is removed, whereby the block B16 repeats the described operation to assume an oscillating condition. In the present embodiment, the resulting oscillation frequency of the block B16 will be nearly 1 kHz (the frequency of PWM signal e being about 5 kHz). Block B17 monitors the oscillation frequency of the block B16, and if the oscillation frequency is equal to or less than a given value, it provides the abnormal oscillation signal g of a high level, but changes it to its low level L whenever the given value is exceeded. Thus, the level of the PWM blocking signal f is rapidly switched in response to the oscillation occurring within the block B16, and such abnormality is detected within the block B17 if the average value of the energizing current for the motor 8 is reduced.

Block FSL

Figure 7:
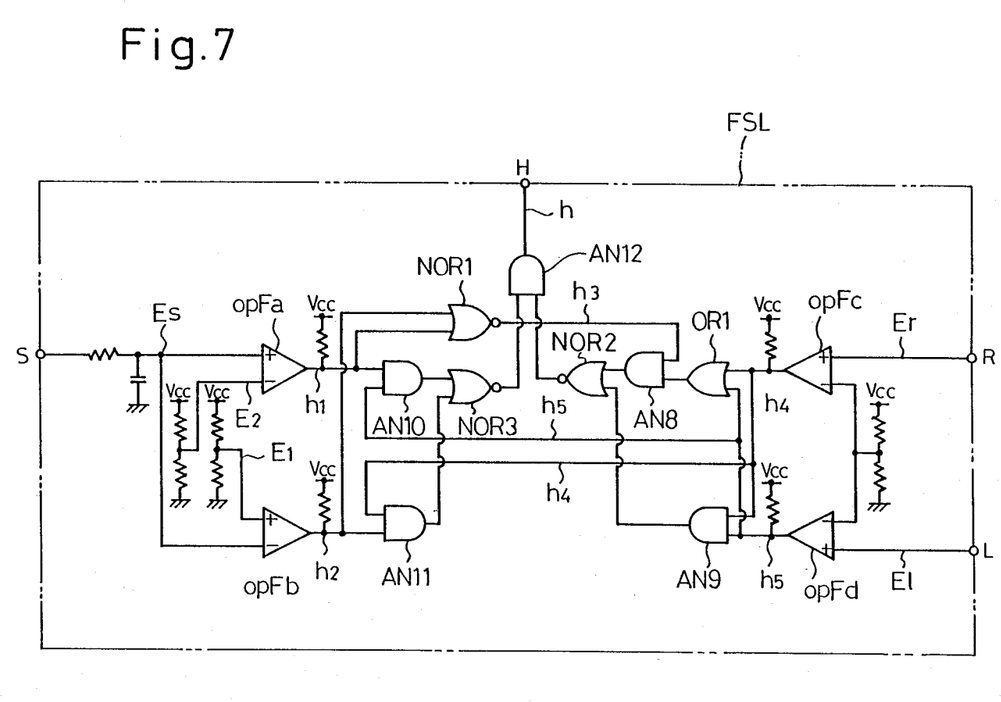

This block is shown in detail in FIG. 7. Specifically, the block includes an input terminal S, to to which the potential obtained from the junction between the pair of strain detecting elements which form the torque sensor 40 is applied. This potential is input to a comparator comprising an operational amplifier opFa and another comparator comprising an operational amplifier opFb. Representing the potential applied to the input terminal S by Es, the neutral potential of the torque sensor 40 representing the absence of any torque applied by $E_o$, and a margin by $\alpha$, the comparator comprising the amplifier opFa delivers a signal $h_1$ which will assume a low level for $Es \leq E_0 + \alpha$ and assumes a high level H for $Es > E_0 + \alpha$. The comparator comprising the amplifier opFb delivers a signal $h_2$ which assumes a low level L for $Es \geq E_0 - \alpha$ and assumes a high level H for $Es > E_0 - \alpha$. The output signals $h_1$ and $h_2$ from these comparators are combined in an NOR gate NOR1. A truth table for the output signal $h_3$ from the gate NOR1 is indicated in Table 2 below where $E_1$ represents $E_0 - \alpha$ and $E_2$ represents $E_0 + \alpha$.

TABLE 2

| | $h_1$ | $h_2$ | $h_3$ |
|---|---|---|---|
| $E_S < E_1$ | L | H | L |
| $E_1 \leq E_S \leq E_2$ | L | L | H |
| $E_2 < E_S$ | H | L | L |

Thus, a combination of the comparators each comprising the amplifier opFa or opFb and the gate NOR1 is effective to define a window comparator containing an idle zone of a size $E_0 \pm \alpha$. The idle zone essentially corresponds to the dead band established within the block B10, though it is slightly less than the latter. Specifically, as the potential from the junction in the torque sensor 40 gradually deviates from the neutral position in response to a twist occurring in the rod 7 as the steering wheel 1 is turned, the output signal $h_3$ from the gate NOR1 initially changes from its high level H to its low level L, and then the response signal d which is output from the block B10 changes from its low level L to its high level.

The block shown in FIG. 7 also includes another input terminal R to which an output from the block B12 is applied, and a further input terminal L to which an output from the block B13 is applied. The output from the block B12 is supplied to a comparator essentially comprising an operational amplifier opFc while an output from the block B13 is supplied to another comparator essentially comprising an operational amplifier opFd. These comparators operate to compare the respective inputs against a reference potential $E_3$ which corresponds to each input when the motor 8 is not energized. Representing an input potential to the input terminal R by Er, and an input potential to the input terminal L by El, the comparator comprising the amplifier opFc delivers a signal $h_4$ which assumes a high level H for $Er \geq E_3$ and assumes a low level L for $Er < E_3$. The comparator comprising the amplifier opFd delivers a signal $h_5$ which assumes a high level H for $El \geq E_3$ and assumes a low level L for $El < E_3$. Thus, when the motor 8 is energized for rotation in the forward direction, the $h_4$ assumes a high level H while the signal $h_5$ assumes a low level. Conversely, when the motor 8 is energized for rotation in the reverse direction, the signal $h_4$ assumes a low level L while the signal $h_5$ assumes a high level H. When the motor 8 is deenergized, the both signals $h_4$ and $h_5$ assume a low level L.

The output signals $h_4$ and $h_5$ are combined in an OR gate OR1, which delivers a signal fed to one input of AND gate AN8 and which will assume a high level H when the motor 8 is energized and which assumes a low level L when the motor 8 is deenergized. The output signal $h_3$ from the gate NOR1 is fed to the other input of the gate AN8. Since the gate NOR1 delivers a high level H when the potential from the junction in the torque sensor 40 is located within the idle zone, the gate AN8 delivers a high level H if the motor 8 is then energized. This represents the existence of an abnormality in that the motor 8 is energized when the potential at the junction in the torque sensor 40 is within the idle zone.

The power transistors Q1 to Q4 are switched such that when the motor 8 is energized for rotation in the forward direction, the energizing current flows through a shunt resistor R3, while when the motor is energized for rotation in the reverse direction, the energizing current flows through a shunt resistor R4. Accordingly, in the absence of any abnormality, the output signal $h_4$ from the comparator comprising the amplifier opFc and the output signal $h_5$ from the comparator comprising the amplifier opFd cannot simultaneously assume a high level H. Any such abnormality can be detected by the gate AN9.

The outputs from the gates AN8 and AN9 are combined in NOR gate NOR2, which delivers a low level L when the motor 8 is energized even though the potential at the junction within the torque sensor 40 is within the idle zone or when an energizing current flows through the motor 8 for causing its rotation in both the forward and the reverse direction, the gate NOR2 delivering a high level H otherwise or in the absence of any such abnormality.

As mentioned previously, the potential at the junction within the torque sensor 40 deviates toward a higher value when the steering wheel 1 is turned to the right and deviates toward a lower value when the steering wheel 1 is turned to the left. Accordingly, as indicated in Table 2, in the former instance, the output signal $h_1$ from the comparator comprising the amplifier opFa assumes a high level H and in the latter instance, the output signal $h_2$ from the comparator comprising the amplifier opFb assumes a high level H. It will be apparent by reference to Table 1 that the energization of the motor 8 for rotation in the reverse direction (driving the wheels 12 to be turned to the right) must be inhibited when the steering wheel 1 is turned to the right while the energization of the motor 8 for rotation in the forward direction must be inhibited when the steering wheel 1 is turned to the left. Thus, the signals $h_1$ and $h_5$ cannot assume a high level H simultaneously, and the signals $h_2$ and $h_4$ cannot assume a high level H simultaneously. Stated conversely, if the signals $h_1$ and $h_5$ assume a high level simultaneously, or if the signal $h_2$ and $h_4$ assume a high level simultaneously, this can be considered as representing the occurrence of some abnormality, which is detected by AND gates AN10 and AN11 and NOR gate NOR3.

The gate AN12 forms a logical product of outputs from the gates NOR2 and NOR3, and delivers a fail-safe abnormality signal h, the truth table of which is given in Table 3 below where similar denotations are used as before.

TABLE 3

| $h_1$ | $h_2$ | $h_3$ | $h_4$ | $h_5$ | h |
|---|---|---|---|---|---|
| * | * | * | L | L | H |
| H | L | L | H | L | H |
| L | H | L | L | H | H |
| * | * | * | H | H | L |
| H | L | L | L | H | L |
| L | H | L | H | L | L |
| L | L | H | L | H | L |
| L | L | H | H | L | L |

Thus, the fail-safe abnormality signal h assumes a low level L when the motor 8 is energized even though the potential at the junction within the torque sensor 40 is within the idle zone, when energizing currents which cause a rotation of the motor 8 in the forward and the reverse direction simultaneously flows, when the motor 8 is energized for rotation in the reverse direction even though the steering wheel 1 is turned to the right or when the motor 8 is energized for rotation in the forward direction even though the steering wheel 1 is turned to the left.

A series of operations occurring in the electrically driven power steering apparatus of the present embodiment which take place under the control of the electrical control system mentioned above and shown in FIGS. 5, 6a, 6b and 7 will now be described.

(1) When the ignition switch IG is turned on, given voltages are supplied to various blocks, and the system is in a standby condition.

(2) When a driver of the vehicle turns the steering wheel 1 clockwise, the steering system is mechanically driven in the manner mentioned previously to change the attitude of the wheel 12 so as to cause a right turn thereof. The steering force is detected by the torque sensor 40, which delivers a torque detection signal which assumes a higher potential than a neutral potential. Conversely, when the driver turns the steering wheel 1 counter-clockwise, the steering system is mechanically driven to change the attitude of the wheel 12 so as to achieve a left turn, and a steering force is again detected by the torque sensor 40, which delivers the torque detection signal having a lower potential than the neutral potential.

(3) As illustrated in FIG. 10, the magnitude of the torque detection signal or the absolute torque signal A as clamped is compared against the sawtooth wave B as shifted, and when the signal A is greater, a high level H is delivered as an output. Accordingly, the pulse width of PWM signal e is proportional to the magnitude of the steering force which has been applied. It will be noted that the level of the torque detection signal with respect to the neutral potential is defined by the rotation signal c having a low level L for a clockwise rotation and a high level H for a counter-clockwise rotation of the steering wheel 1. Accordingly, when the driver turns the steering wheel 1 clockwise, the motor M is energized at a energization power level (mean value) corresponding to the steering force applied for rotation in the forward direction. When the driver turns the steering wheel 1 clockwise, the motor 8 is energized at a proper power level for rotation in the reverse direction. When energized, an assisting steering force from the motor 8 is applied to the steering system, and the total steering force converges to a given value, which can be adjusted by using a corresponding control element VRS. The steering force which is required of the driver is thus reduced.

(4) During the time the motor 8 is energized for rotation in the forward or the reverse direction, the existence of an abnormality is detected in the following manner:

(1) When a reduction in the battery voltage Btt occurs, PWM signal e is blocked to inhibit the energization of the motor 8.

(2) When the torque detection signal continuously exhibits an abnormal value outside the range from 0.5 to 2.5 V, the supply line is disconnected subsequently, blocking PWM signal e to inhibit the energization of the motor 8.

(3) If the energizing current for the motor 8 increases, the pulse width of the PWM signal e is limited, and PWM signal e is blocked in response to a further increase in the energizing current until it is reduced. In this instance, it is possible that the motor 8 be deenergized to produce a temporary reduction in the energizing current, whereby PWM signal e may be repeatedly blocked and passed. Such repetition frequency is monitored, and if it continuously exceeds a given value, the supply line is then disconnected, blocking the PWM signal e to inhibit the energization of the motor 8.

(4) When the motor 8 continues to be energized in excess of a given time interval even though a potential at the junction within the torque sensor 40 is within the idle zone, when energizing currents which cause a rotation of the motor 8 in either forward or reverse direction continue to flow in excess of a given time interval, when the motor 8 is energized for rotation in the reverse direction over a time interval in excess of a given value as the steering wheel 1 is turned to the right, or when the motor 8 is energized for rotation in the forward direction over a time interval in excess of a given value as the steering wheel 1 is turned to the left, the supply line is then disconnected, blocking PWM signal e to inhibit the energization of the motor 8.

(5) In the event of an overheating of power transistors Q1 to Q4, the supply line is disconnected to inhibit the energization of the motor 8 until the temperature is lowered.

In the apparatus of the embodiment mentioned above, the deenergization of the motor 8 results in substantially a manual steering operation, and accordingly, a detection of the existence of an abnormality causes only inhibiting the energization of the motor 8. However, a clutch may be interposed between the output shaft 28 of the motor 8 and the output shaft 21 to deenergize the clutch at the same time as the energization of the motor 8 is inhibited in response to the detection of an abnormality, thus disconnecting the transmission of a driving power between the shafts 28 and 21. This arrangement will be effective particularly in a system involving an increased loading of an unenergized motor upon a steering system.

It is to be understood that mechanical or electrical arrangement used in the embodiment described above is not meant to limit the invention in any way, but that a torque sensor or a sensor which detects an energizing current for the motor may be replaced by any other known sensor.

From the foregoing, it will be understood that according to the invention, a relationship between a steering force which is applied by a manual operation and an energizing condition of a motor is monitored, thereby allowing any abnormality in the relationship between a steering operation by a driver and the energization of the motor to be detected in an accurate manner. A motor assisted steering apparatus is monitored to see if it operates as designed, and hence no additional sensors which have no direct connection with such operation can be dispensed with. In effect, considering the embodiment mentioned above, the only element which is added in order to implement the invention is the block FSL, which however is a very simple logic circuit as will be evident from FIG. 7.

What is claimed is:

1. An abnormality detector for detecting an abnormality in a motor assisted steering apparatus, the apparatus comprising:
   a steering mechanism for adjusting the orientation of wheels with respect to a car body;
   an input means for manually inputting a steering force to adjust the wheels with respect to the car body;
   an input detecting means for detecting steering force information indicative of the magnitude of the steering force manually input to the input means;
   an motor producing a drive force;
   an energization control means for controlling the energization or deenergization of the motor in accordance with at least the steering force information from the input detecting means;
   a transmission mechanism for transmission to the steering mechanism the steering force manually input to the input means combined with the drive force produced by the motor;
   an operation condition detecting means for detecting operation information indicative of an operational condition of the motor; and
   an abnormality annunciator means for monitoring the steering force information and the operation information and for annunciating the existence of an abnormality in the event the operation information detected by the operating condition detecting means indicates the motor is developing the drive force and the steering force information from the input detecting means remains within a predetermined range.

2. The apparatus according to claim 1 wherein the controlling by the energization control means comprises deenergizing the motor when the steering force information from the input detecting means is within a given range, and energizing the motor in response to the steering force manually input to the input means, when the steering force information from the input detecting means goes outside the given range.

3. The apparatus according to claim 2 wherein the abnormality annunciator means is further capable of annunciating the existence of an abnormality if the operation information detected by the operating condition detecting means indicates that the motor is developing a drive force different than the steering force information from the input detection means which deviates by a predetermined relationship.

4. The apparatus according to claim 1 wherein the controlling by the energization control means energizes the motor for rotation in a forward direction when the steering force information from the input detecting means indicates the use of a steering force which turns the wheels to the right with respect to the car body, and energizes the motor for rotation in a reverse direction when the steering force information from the input detecting means indicates the use of a steering force which turns the wheels to the left with respect to the car body.

5. The apparatus according to claim 4 wherein the abnormality annunciator means annunciates the existence of an abnormality when the steering force information from the input detecting means indicates the use of a steering force which turns the wheels to the right with respect to the car body and when the operation information from the operation condition detecting means indicates that the motor is energized for rotation in the forward direction, or annunciates the existence of an abnormality when the steering force information from the operation condition detecting means indicates the use of a steering force which turns the wheels to the left with respect to the car body and when the operation information from the operation condition detecting means indicates that the motor is energized for rotation in the reverse direction.

6. The apparatus according to claim 4 wherein the abnormality annunciator means annunciates the existence of an abnormality when the operation information from the operation condition detecting means indicates that the energization of the motor for rotation in the forward and the reverse direction occurs simultaneously.

7. The apparatus according to claim 1 wherein the operation condition detecting means comprises means for detecting an energizing current for the motor which causes rotation in the forward direction and means for detecting an energizing current for the motor which causes rotation in the reverse direction.

8. The apparatus according to claim 7 wherein said means for detecting an energizing current for the motor which causes rotation in the forward direction comprises a first resistor connected in a supply line which enables the motor to be energized for rotation in the forward direction, and said means for detecting an energizing current for the motor which causes rotation in the reverse direction comprises a second resistor connected in a supply line which enables the motor to be energized for rotation in the reverse direction.

9. The apparatus according to claim 1 wherein the abnormality annunciator means annunciates the existence of an abnormality when the operation information detected by the operation condition detecting means indicates the motor is developing the drive force at a magnitude in excess of a given limit, the abnormality annunciator means removing such annunciation when the operating information detected by the operation condition detecting means indicates the motor is developing a drive force at a magnitude equal to or less than the given limit.

10. The apparatus according to claim 1 wherein the energization control means deenergizes the motor when the abnormality annunciator means annunciates the existence of an abnormality.

11. The apparatus according to claim 10 wherein the abnormality annunciator means annunciates the existence of an abnormality when the operation information detected by the operation condition detecting means indicates the motor is developing a drive force of a magnitude in excess of a given limit, the abnormality annunciator means removing such annunciation when the operation information detected by the operation condition detecting means indicates the motor is developing a drive force of a magnitude equal to or less than the given limit.

12. The apparatus according to claim 11 wherein the abnormality annunciator means continues to annunciate the existence of an abnormality when an abnormality is annunciated in excess of a given time interval.

13. An abnormality detector for detecting an abnormality in a motor assisted steering apparatus, the apparatus comprising:
a steering mechanism for adjusting the orientation of wheels with respect to a car body;
an input means for manually inputting a steering force to adjust the wheels with respect to the car body;
an input detecting means for detecting steering force information indicative of the magnitude of the steering force manually input to the input means;
an electric motor producing a drive force;
an energization control means for controlling the energization or deenergization of the electric motor in accordance with at least the steering force information from the input detecting means;
a transmission mechanism for transmission to the steering mechanism the steering force manually input to the input means combined with the drive force produced by the electric motor;
an operation condition detecting means for detecting operation information indicative of an operational condition of the electric motor;
an abnormality annunciator means for annunciating the existence of an abnormality in the event a relationship between the steering force manually input to the input means, and the operation information detected by the operation condition detecting means deviates from the predetermined relationship;
the energization control means energizing the electric motor for rotation in a forward direction when the steering force information from the input detecting means indicates the use of a steering force which turns the wheels to the right with respect to the car body, and energizing the electric motor for rotation in a reverse direction when the steering force information from the input detecting means indicates the use of a steering force which turns the wheels to the left with respect to the car body; and
the abnormality annunciator means annunciating the existence of an abnormality when the steering force information from the input detecting means indicates the use of a steering force which turns the wheels to the right with respect to the car body and when the operation information from the operation condition detecting means indicates that the motor is energized for rotation in the forward direction, or annunciating the existence of an abnormality when the steering force information from the operation condition detecting means indicates the use of a steering force which turns the wheels to the left with respect to the car body and when the operation information from the operation condition detecting means indicates that the motor is energized for rotation in the reverse direction.

14. The apparatus according to claim 13 wherein the operation condition detecting means comprises means for detecting an energizing current for the electric motor which causes rotation in the forward direction and means for detecting an energizing current for the electric motor which causes rotation in the reverse direction.

15. The apparatus according to claim 14 wherein said means for detecting an energizing current for the electric motor which causes rotation in the forward direction comprises a first resistor connected in a supply line which enables the motor to be energized for rotation in the forward direction, and said means for detecting an energizing current for the electric motor which causes rotation in the reverse direction comprises a second resistor connected in a supply line which enables the electric motor to be energized for rotation in the reverse direction.

16. The apparatus according to claim 13 wherein the abnormality annunciator means annunciates the existence of an abnormality when the operation information detected by the operation condition detecting means indicates the electric motor is developing the drive force at a magnitude in excess of a given limit, the abnormality annunciator means removing such annunciation when the operating information detected by the operation condition detecting means indicates the electric motor is developing a drive force at a magnitude equal to or less than the given limit.

17. The apparatus according to claim 13 wherein the energization control means deenergizes the electric motor when the abnormality annunciator means annunciates the existence of an abnormality.

18. The apparatus according to claim 17 wherein the abnormality annunciator means annunciates the existence of an abnormality when the operation information detected by the operation condition detecting means indicates the electric motor is developing a drive force of a magnitude in excess of a given limit, the abnormality annunciator means removing such annunciation when the operation information detected by the operation condition detecting means indicates the electric motor is developing a drive force of a magnitude equal to or less than the given limit.

19. The apparatus according to claim 18 wherein the abnormality annunciator means continues to annunciate the existence of an abnormality when an abnormality is annunciated in excess of a given time interval.

20. An abnormality detector for detecting an abnormality in a motor assisted steering apparatus, the apparatus comprising:

a steering mechanism for adjusting the orientation of wheels with respect to a car body;
an input means for manually inputting a steering force to adjust the wheels with respect to the car body;
an input detecting means for detecting steering force information indicative of the magnitude of the steering force manually input to the input means;
an electric motor producing a drive force;
an energization control means for controlling the energization or deenergization of the electric motor in accordance with at least the steering force information from the input detecting means;
a transmission mechanism for transmission to the steering mechanism the steering force manually input to the input means combined with the drive force produced by the electric motor;
an operation condition detecting means for detecting operation information indicative of an operational condition of the electric motor; and
an abnormality annunciator means for annunciating the existence of an abnormality in the event a relationship between the steering force manually input to the input means, and the operation information detected by the operation condition detecting means deviates from a predetermined relationship;
the energization control means energizing the electric motor for rotation in a forward direction when the steering force information from the input detecting means indicates the use of a steering force which turns the wheels to the right with respect to the car body, and energizing the electric motor for rotation in a reverse direction when the steering force information from the input detecting means indicates the use of a steering force which turns the wheels to the left with respect to the car body; and
the abnormality annunciator means annunciating the existence of an abnormality when the operation information from the operation condition detecting means indicates that the energization of the motor for rotation in the forward and the reverse direction occurs simultaneously.

* * * * *